United States Patent [19]

Steel et al.

[11] E Re. 29,295

[45] Reissued July 5, 1977

[54] TREATMENT PROCESS

[75] Inventors: Margaret Lillian Steel; Frank Holt, both of Runcorn, England

[73] Assignee: Imperial Chemical Industries Limited, London, England

[22] Filed: Oct. 29, 1976

[21] Appl. No.: 737,191

Related U.S. Patent Documents

Reissue of:

[64] Patent No.: 3,950,182
Issued: Apr. 13, 1976
Appl. No.: 524,946
Filed: Nov. 18, 1974

[30] Foreign Application Priority Data

Nov. 20, 1973 United Kingdom .....53771/73
Mar. 8, 1974 United Kingdom .....10521/74
Mar. 24, 1974 United Kingdom .....13083/74

[52] U.S. Cl. .....106/308C; 241/15; 241/22
[51] Int. Cl.[2] .....B02C 23/06
[58] Field of Search .....75/1; 106/308C, 314; 241/15, 241/16, 22, 26, 27, 30, 184

[56] References Cited

UNITED STATES PATENTS

| | | | |
|---|---|---|---|
| 2,346,151 | 4/1944 | Burk | 241/16 XR |
| 3,295,766 | 1/1967 | Tueter | 241/15 |
| 3,325,105 | 6/1967 | Veltman | 241/16 |
| 3,442,673 | 5/1969 | Serafin | 241/22 XR |
| 3,443,976 | 5/1969 | Dodson et al. | 241/16 XR |
| 3,607,326 | 9/1971 | Serafin | 241/16 |
| 3,767,750 | 10/1973 | Groszek et al. | 241/30 |

FOREIGN PATENTS OR APPLICATIONS

| | | |
|---|---|---|
| 1,309,074 | 3/1973 | United Kingdom |

*Primary Examiner*—Granville Y. Custer, Jr.
*Attorney, Agent, or Firm*—Cushman, Darby and Cushman

[57] ABSTRACT

Minerals, including metal ores, fillers and coal, are ground with a grinding aid which is an ionic polysaccharide, *in which the polysaccharide is a cellulose,* particularly sodium carboxymethyl cellulose.

23 Claims, No Drawings

TREATMENT PROCESS

This invention relates to the wet grinding of minerals.

The wet grinding of minerals is employed as a step in many industries, particularly as an intermediate process in the extraction of metals from their ores. The process is one which increases the surface area of the material and also, by reduction of the average particle size of the mineral, facilitates subsequent process steps, e.g. flotation separation or chemical treatment. Such grinding operations are usually carried out in mills such as ball, bead, rod and pebble mills, depending upon the degree of comminution required.

The present invention provides a mineral grinding process in which the mineral is subjected to a grinding operation in the presence of an ionic, preferably a carboxylated *cellulose* polysaccharide (hereinafter referred to as the "grinding aid").

The minerals which are subjected to the grinding operation according to the invention are any of a wide range of solid grindable materials, particularly inorganic materials including metal ores.

As examples of metal ores which may with advantage be treated using our process we may mention those of gold, silver, nickel, iron, copper, lead and any other ores which conventionally may be subjected to a wet grinding treatment.

Minerals which are not conventionally employed as metal ores but which may with advantage be treated according to the invention include any which are conventionally subjected to a grinding operation or which are rendered grindable by the present invention. Such minerals include fillers, e.g. for use in resins, and fertilisers, e.g. Senegal rock. Other materials which may be treated include solid organic materials of low water solubility such that they may be ground in aqueous media e.g. coal, drugs, fertilisers etc. The word 'mineral' is used herein to include all such low solubility materials.

The grinding operation of the invention is preferably carried out in the presence of a polar liquid medium which will dissolve at least sufficient of the grinding aid to produce an improvement in grinding efficiency, although the use of a liquid medium comprising a liquid which itself is not a solvent for the grinding aid may be feasible providing that a solvent for the grinding aid is also present. Water is the preferred medium. The concentration of mineral in the liquid medium may vary within wide limits and we prefer to operate with solids mineral contents within the range 50–90%, preferably 60–85, and particularly 70–82 by weight of the mineral/liquid medium composition; however lower concentrations e.g. down to say, 25% by weight may be appropriate for some minerals.

The *cellulose* polysaccharide employed as the grinding aid is, then, preferably water soluble or at least is sufficiently soluble in a polar liquid medium employed according to the invention to produce an improvement in grinding effectiveness.

The grinding aid is preferably one comprising a *cellulose* polysaccharide 'backbone' and having at least a degree of substitution in the side chains or in the ring. Particularly preferred are *cellulose* polysaccharides in which a proportion at least of the hydroxyl groups are substituted by carboxyl groups. Generally we prefer a degree of substitution such that about 5 to 90% of the hydroxyl groups are substituted, more usually 5 to 50%. The degree of substitution influences the solubility of the grinding aid and choice of a suitable material can be made on the basis of simple trial. The carboxyl groups preferably are carboxylate groups of chain length such that from 1 to 5 atoms are interposed between the carboxyl group and the hexose ring. The preferred grinding aid employed according to the invention is a metal salt of a carboxylalkyl cellulose. A particularly preferred salt is sodium carboxyl methyl cellulose, although other metals e.g. potassium and alkyl groups e.g. ethyl and aryl groups are not excluded.

[Other polysaccharides are well known to those skilled in the art, and we would mention, as examples, the substituted starches, pectates, alginates and carragheenates.]

The suitability of grinding aids for use in association with the particular mineral being treated may be determined by simple trial, as also may the optimum concentration of the aid. Thus we have found that higher molecular weight aids are often more effective in lower rather than higher concentration. The degree of substitution also influences the suitability of a particular material as a grinding aid, as also does the hydrophilicity of the substituents—hydrophilic substituents being preferred. Again the effect of such variables upon the effectiveness of the material as a grinding aid can readily be tested.

The concentration of grinding aid employed may vary within wide limits, although economic factors will often influence the level used. In general we prefer to employ an amount within the range 0.005 to 5%, preferably 0.01 to 2%, more preferably 0.03 to 1% of the dry weight of mineral being treated. At lower concentrations care has to be taken that 'starvation' of the slurry does not occur, i.e. that the quantity of grinding aid does not fall to too low a level for it to be effective.

The purity of the grinding aid should be taken into consideration in determining the quantity to be employed, since purities of as low as 40% are not uncommon. Preferably we employ material having a purity greater than 60%, particularly greater than 80%. For reasons of economy, however, grinding aids of relatively low purity may be convenient. Any impurities present should not adversely affect the beneficial effect of the grinding additive to an unacceptable degree; this can easily be ascertained by simple trial.

Grinding is often preceded by crushing, e.g. in stamp mills, and while we have described the use of the grinding aid only in the grinding step, there may be advantage in including it at the crushing stage also. Thus, it may conveniently be added to the mineral before any comminution treatment is applied.

The results set out in Examples 1 to 6 below were obtained using the following grinding technique, which is illustrative of those used in conventional comminution processes.

Grinding was carried out in a ball mill having a capacity of 1 litre. The mill dimensions were:

| | |
|---|---|
| Internal diameter | 114 mm |
| External diameter | 140 mm |
| Internal length | 121 mm |
| External length | 176 mm |

The balls used were of stainless steel or porcelain and any one ball charge used contained three sizes of ball:

| | Ball Charge | | |
|---|---|---|---|
| | 19 mm discs | 12.7 mm discs | 9.5 mm discs |
| Steatite balls | 350 g | 240 g | 250 g |
| Stainless steel balls | 800 g | 600 g | 600 g |

Sodium carboxymethyl cellulose is widely available commercially. The forms which we have found to be effective in the process of the invention are those having a molecular weight within the range 1000 to 1,000,000, preferably 5000 to 300,000, more preferably 8000 to 200,000 and particularly within the range 10,000 to 100,000.

Using a set of motor driven rollers the mill was rotated at a fixed speed (r.p.m.). A speed of 90 r.p.m. was employed for most of the measurements. This speed corresponded to about 72% critical speed (critical speed is the theoretical speed at which the contents of the mill start to centrifuge calculated as $$\text{critical speed} = \frac{76.5}{\sqrt{\text{int. dia. of mill in feet}}}$$

Commercial grinding using ball mills is usually carried out at 70–85% critical speed).

Effective grinding time was maintained constant by allowing equal numbers of revolutions, so removing as far as possible inconsistencies due to transitory speed variations. Blank runs were carried out simultaneously under the same grinding conditions but omitting the grinding aid.

The mineral employed in most of the test was granite/gold ore mixture. This was put into the mill in the following mix:

distilled water 100 g

Granite/gold ore 250 g

These figures correspond to conventional practice of using 20 to 30% moisture content. Granite was added as it typically represents the major part of any metalliferous ore.

The grinding aid was weighed and dissolved into the water before adding to the mill.

Experimental analysis included particle size grading before and after grinding. Before grinding, analysis was used to ensure that the charge had a typical and desired particular size profile, this being adjusted by addition of appropriate fractions if necessary. After grinding, the slurry was wet filtered through a stack of standard sieves into different size fractions, and after wet sieving each fraction was dried on the sieves (100°C for 30 minutes) and then resieved dry. The weight percentage of each size range was calculated from these results.

The smallest sieve size employed was a 53 micron sieve and the efficiency of grinding to less than 53 micron diameter particles was used as the basis for assessing the effectiveness of the grinding aid in most of the Examples.

We find that an appropriate particle diameter at commencement of grinding is usually less than 20 mm, preferably less than 10 mm and more preferably less than 5 mm.

A further advantage which we have found when using the grinding aids of the invention is that they act to some extent as suspending or viscosity aids. Thus, we have found that the presence of the grinding aids of the invention in a slurry or suspension of particulate minerals may reduce the viscosity of the suspension to a level below that of the suspension without the aid. Thus, say, ground coal, drugs or fertiliser may be suspended in a slurry which has a low viscosity relative to what it would have in the absence of the aid, and this may have an advantage for example when such slurries are to be pumped through pipelines. The stability of the suspension may also be improved. Similar levels of grinding aid may be employed as are described above and particle dimensions may be of the order of 20 to 1000 microns, preferably 30 to 500 microns and more preferably 40 to 100 microns.

This aspect of the invention, therefore, provides a fluid composition having improved pumpability or suspension characteristics, and this is particularly valuable in the case of fuels, for example fluid fuels comprising ground coal suspended in a liquid medium which may be aqueous or organic. In particular such a fluid fuel could be, for example, ground coal suspended in a liquid medium at least a component of which is itself a fuel, for example a combustible oil.

The improved suspension characteristics may be of value in prolonging the shelf life of suspensions of particulate minerals in liquids. It will be appreciated that for use as a suspension stabilising aid the grinding aid need not be present during a preparative or comminution operation, although that is preferred. The stabilising function of the grinding aid may be retained after dehydration of the ground mineral and we have found, for example, that mineral ground in the presence of the grinding aid of the invention and subsequently dried to a free flowing powder could be resuspended in a suitable suspending medium if the grinding aid had not been subjected to very deleterious conditions between the grinding and resuspending operations.

The experimental results are set out in the following Examples.

EXAMPLE 1

The mill charge was dry sieved and only particles between 3350 and 4000 microns introduced into the mill and the grinding aid, where used, was dissolved in the appropriate volume of water. Its concentration was 0.4% on the dry charge weight.

The following results were obtained after 24 hours grinding:

| Additive | wt% of material less than 53 microns |
|---|---|
| Blank | 49.5 |
| Sodium methyl xanthate | 10.1 |
| NaCl | 35.9 |
| Sugar | 48.1 |
| Urea | 48.1 |
| SCMC (10) | 74.6 |

SCMC = sodium carboxymethyl cellulose. The (10) indicates an approximate m.w. of 10,000 and in subsequent mention of SCMC the number in parenthesis indicates the approximate m.w. in thousands. The SCMC used was usually in the 'Cellofas' (RTM) range of ICI.

EXAMPLE 2

Example 1 was repeated using stainless steel balls of total weight 2000 g.

This example illustrates that the beneficial effect of SCMC is apparent where grinding times vary and when different particle sizes are employed in the mill charge.

| Charge Sizes | Additive | No. of revolutions | Wt% of material less than 53 microns |
|---|---|---|---|
| 3350μ–4000μ | Blank | 16200 | 24.5 |
| | SCMC (50) | 16200 | 38.3 |
| 4000μ–9500μ | Blank | 5400 | 24.1 |
| | SCMC (10) | 5400 | 30.7 |
| | SCMC (50) | 5400 | 29.3 |
| 1000μ–9500μ | Blank | 5400 | 42.0 |
| | SCMC (10) | 5400 | 47.1 |

EXAMPLE 3

Using an equivalent grind time of 5400 revolutions, this example illustrates the effect of the molecular weight of the SCMC upon increase in grinding efficiency at 0.4% SCMC concentration.

| Additive | Weight % of material less than 53μ |
|---|---|
| Blank | 24.1 |
| SCMC (1) | 25.2 |
| SCMC (5) | 24.5 |
| SCMC (10) | 30.7 |
| SCMC (50) | 27.8 |

EXAMPLE 4

The substitution of hydroxyl groups on the cellulose molecule by methyl and hydroxypropyl groups instead of the —O—$CH_2COO$ Na groups of sodium carboxymethyl cellulose gives a range of compounds of apparently similar molecular structure which do not, however, show the same advantages as SCMC when used as an additive in grinding.

The equivalent grinding time was 16200 revolutions

| Additive | | Weight % of material less than 53 microns |
|---|---|---|
| Blank | | 24.5 |
| Celacol HPM | 0.4% concentration | 17.3 |
| SCMC (50) | 0.4% concentration | 38.3 |

EXAMPLE 5

The graph illustrates the effect of duration of grinding upon the effect of SCMC (50) (Cellofas B50) in 0.4% concentration on weight of granite. Experimental details were as above, except that granite alone was used as the mineral (i.e. no gold ore).

EXAMPLE 6

Using an equivalent grind time of 356000 revolutions this example illustrates the effect of [SMC] *SCMC* (50) (Cellofas B50) concentration on the grinding efficiency and viscosity reduction of coal dust slurries. The coal dust which was fed to the mill was less than 30 mesh size.

The viscosity of coal slurries varies with the rate of shear i.e. they are non-Newtonian pseudoplastic fluids. The viscosity measurements on a Brookfield Viscometer were made therefore at a constant shear stress of 40 $sec^{-1}$.

Despite the lower concentration of solids (50%) in the blank, it gave a slurry with a higher viscosity than the viscosities of the 60% slurries containing the polysaccharide.

| Coal loading % by weight | Dispersant Addition % by weight on coal | Brookfield Viscosity (P) at 100 rpm |
|---|---|---|
| 50 | Blank | 43.0 |
| 60 | 0.2 | 40.8 |
| 60 | 0.45 | 28.0 |
| 60 | 0.70 | 17.5 |
| 60 | 0.93 | 10.2 |

EXAMPLE 7

This example was carried out using commercial grinding apparatus, employing a mill charge of 400 lb of balls, the balls ranging from 0.75 to 2.5 inches in diameter.

Granite was sieved and the fraction passing a ⅜-inch sieve was crushed twice in a cone crusher. The crushed granite was fed to the ball mill at 5 kg/min.

After 1½ hours (allow time for equilibration) the mill discharge was sampled and 80% of the discharge passed a 210 micron sieve. After a further 20 minutes 79.8% passed the sieve.

Cellofas B50 was then added in 0.0545% concentration on the wet granite being fed to the mill from the cone crusher. After 20 minutes the mill discharge was sampled and 89.1% passed a 210 micron sieve.

EXAMPLE 8

Example 1 was repeated using as grinding aid carboxylated starch and alginate, with the following results:

| Grinding Aid | conc$^n$ | increase in wt % of material $<53\mu$ cf water blank |
|---|---|---|
| Carboxylated starch | 0.4 | 14.4 |
| (Solvitose H) | 0.04 | 18.2 |
| Sodium alginate | 0.04 | 8.7 (material $<250\mu$) |

What we claim is:

1. A mineral comminution process which comprises comminuting the mineral in the presence of a liquid medium comprising an ionic polysaccharide, *in which the polysaccharide is a cellulose.*

2. A process according to claim 1 in which the polysaccharide is a carboxylated polysaccharide.

3. A process according to claim 2 in which the polysaccharide has from 1 to 5 carbon atoms between the carboxyl group and the hexose ring.

4. A process according to claim 1 in which from 5 to 90% of the hydroxyl groups in the polysaccharide are substituted with an ionic grouping.

5. A process according to claim 4 in which from 10 to 50% of the hydroxyl groups are substituted with an ionic grouping.

[6. A process according to claim 1 in which the polysaccharide is a cellulose, starch, pectate, alginate or a carraghenate.]

7. A process according to claim [6] *1* in which the polysaccharide is an alkali metal salt of carboxymethyl cellulose.

8. A process according to claim 7 in which the molecular weight of the carboxy methyl cellulose is from 1,000 to 1,000,000.

9. A process according to claim 8 in which the molecular weight is from 5,000 to 300,000.

10. A process according to claim 1 in which the polysaccharide is present in the proportion of 0.005% to 5% of the dry weight of the mineral.

11. A process according to claim 10 in which the polysaccharide is present in the proportion of 0.01% to 2% of the dry weight of the mineral.

12. A process according to claim 1 in which the liquid medium is polar.

13. A process according to claim 12 in which the liquid medium comprises water.

14. A process according to claim 1 in which the minerals is an inorganic material.

15. A process according to claim 14 in which the mineral is a metal ore.

16. A process according to claim 1 in which the mineral is an organic material.

17. A process according to claim 16 in which the mineral is coal.

18. A process according to claim 1 in which the mineral forms from 50 to 90% by weight of the total solid and liquid weight.

19. A dry particulate composition comprising a comminuted mineral material and an ionic polysaccharide, *in which the polysaccharide is a cellulose.*

[20. A composition according to claim 19 in which the polysaccharide is selected from the group consisting of a cellulose, starch, pectate, alginate and carraghenate.]

21. A composition according to claim [20] *19* in which the polysaccharide is an alkali metal salt of carboxymethyl cellulose.

22. A composition according to claim 21 in which the polysaccharide is sodium carboxymethyl cellulose.

23. A method of transporting a mineral which comprises comminuting the mineral by the process of claim 1 and conveying the resulting slurry comprising the mineral and ionic *cellulose* polysaccharide by pipeline.

24. A mineral slurry comprising a comminuted mineral and anionic *cellulose* polysaccharide in a liquid medium.

25. A slurry according to claim 24 in which the polysaccharide is an alkali metal salt of carboxymethyl cellulose.

* * * * *